(12) United States Patent  (10) Patent No.: US 7,617,504 B1
Hill et al.  (45) Date of Patent: Nov. 10, 2009

(54) COMPUTER METHOD AND SYSTEM FOR INTEGRATING ENTERPRISE JAVABEANS INTO NON-JAVA ENVIRONMENTS

(75) Inventors: B. Martin Hill, Lancaster, TX (US); Robert D. Allen, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 967 days.

(21) Appl. No.: 10/657,579

(22) Filed: Sep. 8, 2003

Related U.S. Application Data (60) Provisional application No. 60/410,036, filed on Sep. 12, 2002.

(51) Int. Cl.
*G06F 9/44* (2006.01)
*G06F 15/167* (2006.01)

(52) U.S. Cl. .................. 719/331; 709/213; 719/312; 719/314

(58) Field of Classification Search ............... 707/1–10; 709/201–207, 213–219; 715/733, 734, 740, 715/749; 719/311–318, 328, 330–332
See application file for complete search history.

(56) References Cited

U.S. PATENT DOCUMENTS

| | | | | |
|---|---|---|---|---|
| 5,948,066 | A * | 9/1999 | Whalen et al. | 709/229 |
| 6,836,889 | B1 * | 12/2004 | Chan et al. | 719/310 |
| 7,047,525 | B2 * | 5/2006 | Prunty et al. | 717/137 |
| 7,159,224 | B2 * | 1/2007 | Sharma et al. | 719/310 |
| 2002/0032783 | A1 * | 3/2002 | Tuatini | 709/229 |
| 2002/0120697 | A1 * | 8/2002 | Generous et al. | 709/206 |
| 2002/0147962 | A1 * | 10/2002 | Hatanaka | 717/102 |
| 2002/0199032 | A1 * | 12/2002 | Seidman et al. | 709/315 |
| 2003/0163450 | A1 * | 8/2003 | Borenstein et al. | 707/1 |
| 2003/0167355 | A1 * | 9/2003 | Smith et al. | 709/328 |
| 2005/0149914 | A1 * | 7/2005 | Krapf et al. | 717/136 |
| 2005/0223392 | A1 * | 10/2005 | Cox et al. | |
| 2006/0036448 | A1 * | 2/2006 | Haynie et al. | 705/1 |

FOREIGN PATENT DOCUMENTS

JP  2000250768 A  *  9/2000

\* cited by examiner

*Primary Examiner*—Li B Zhen
*Assistant Examiner*—Charles E Anya (57) ABSTRACT

Disclosed herein is a method of accessing an Enterprise Java Bean (EJB) by a non-Java application within a computing environment, comprising: calling a client library by the non-Java application; invoking a function within the client library to construct an HTTP request corresponding to the calling input parameters from the non-Java application; passing the HTTP request from the client library to an EjbServlet; invoking a method on an EJB by the EjbServlet based upon the HTTP request; returning information from the invoked method from the EJB to the EjbServlet; decoding the returned information into an HTTP response string by the EjbServlet; transmitting the HTTP response from the EjbServlet to the client library; and parsing the HTTP response by the client library into return information compatible with the non-Java application and then passing the return information from the client library to the non-Java application.

26 Claims, 1 Drawing Sheet

Fig. 1

COMPUTER METHOD AND SYSTEM FOR INTEGRATING ENTERPRISE JAVABEANS INTO NON-JAVA ENVIRONMENTS

CROSS-REFERENCE TO RELATED APPLICATIONS

The present application claims the benefit of U.S. provisional application Ser. No. 60/410,036, filed Sep. 12, 2002 and entitled "WebCall2," which is hereby incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention generally relates to the integration of components in the field of enterprise computing. More specifically, the invention relates to a method for integrating the capabilities provided by Enterprise JavaBean components with non-Java computing environments.

BACKGROUND OF THE INVENTION

In the field of enterprise computing, much of the focus on integration has been directed at the problem of integrating non-Java systems into Java-based computing environments. The inverse problem of integrating Java components, especially Enterprise JavaBeans, into non-Java environments has received relatively little attention to date. Enterprise JavaBeans (EJBs) are a Java API (Application Program Interface) specification developed by Sun Microsystems that defines a component architecture for multi-tier client/server systems. A few commercially available Enterprise Application Integration (EAI) products offer some help with integrating Java components into non-Java environments, but few currently provide turnkey support for integrating EJBs. CORBA products also offer some help with this problem, but not all non-Java environments are supported by the major vendors of CORBA infrastructure services, for example, Clarify ClearBasic. Therefore, a need exists for a method and system to integrate the capabilities provided by EJBs with non-Java systems, especially for non-Java environments such as legacy mainframe systems that do not have CORBA support.

SUMMARY OF THE INVENTION

Disclosed herein is a method of accessing an Enterprise Java Bean (EJB) by a non-Java application within a computing environment, comprising: calling a client library by the non-Java application; invoking a function within the client library to construct an HTTP request corresponding to the calling input parameters from the non-Java application; passing the HTTP request from the client library to an EjbServlet; invoking a method on an EJB by the EjbServlet based upon the HTTP request; returning information from the invoked method from the EJB to the EjbServlet; decoding the returned information into an HTTP response string by the EjbServlet; transmitting the HTTP response from the EjbServlet to the client library; and parsing the HTTP response by the client library into return information compatible with the non-Java application and then passing the return information from the client library to the non-Java application. In an embodiment, the HTTP request and the HTTP response are passed between the client library and the EjbServlet via an HTTP protocol, wherein the HTTP protocol enables the client library and EjbServlet to communicate across a distributed computing environment. In an embodiment, the calls between the client library and the non-Java application are based upon the C language calling convention.

Also disclosed is a computing system for accessing an EJB by a non-Java application comprising: a non-Java application in communication with a client library; a means for calling the client library from the non-Java application wherein said means for calling the client library is used to establish communication between the non-Java application and the client library; an EjbServlet in communication with the client library wherein the client library comprises a function to take input parameter information from the call, embed the information into an HTTP request, and transfer the request to the EjbServlet; a means for transferring information between the client library and the EjbServlet wherein said means for transferring it is used to establish communication between the EjbServlet and the client library via an HTTP protocol; the EjbServlet configured to receive the HTTP request from the client library and invoke a corresponding method on the EJB; and a remote method interface (RMI) for invoking and returning Java objects between the EjbServlet and the EJB.

DETAILED DESCRIPTION OF THE PREFERRED EMBODIMENTS

System Overview

Figure 1:
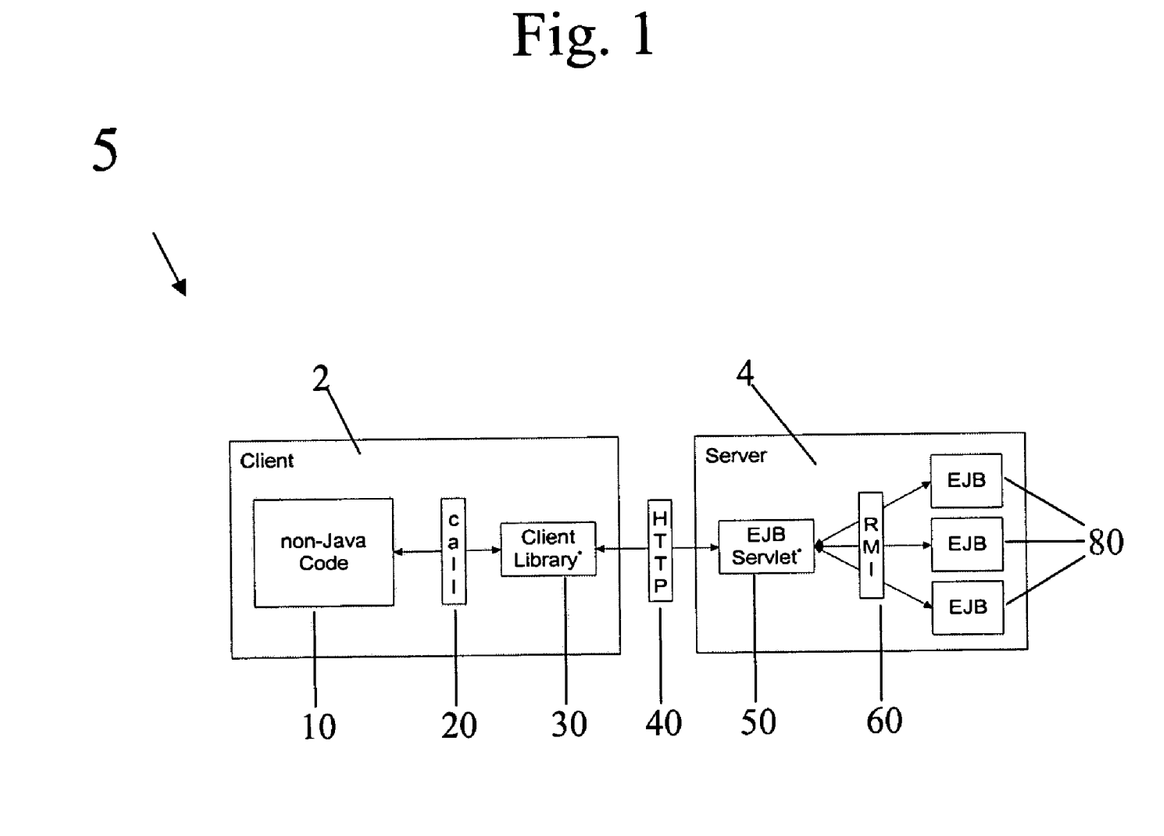
FIG. 1 is a diagrammatic representation of a computing environment in which the present disclosure is used for integrating Enterprise JavaBeans into a non-Java system.

FIG. 1 shows a computing system 5 wherein one or more Enterprise JavaBeans (EJBs) are integrated into non-Java systems. The computing system 5 comprises a non-Java client 2 in communication with a Java-based server 4, for example a distributed client/server computing system wherein the client and server communicate via a connection or communication pathway such as HTTP protocol 40. Non-Java client 2 further comprises a non-Java application 10 in communication with a WebCall client library 30, for example via a call 20. Java-based server 4 further comprises a WebCall EjbServlet 50 in communication with one or more EJBs 80, for example via a remote method interface (RMI) 60.

Definition of Webcall

The present disclosure as depicted in the computing system 5 shown in FIG. 1 can be referred to as WebCall. WebCall is a distributed component for integrating EJBs into non-Java systems. WebCall makes it possible for non-Java code to call any method supported by any EJB and receive the returned information, typically in the form of an object. In an embodiment, WebCall can also make subsequent calls to methods on the returned object. In either case, the clients of WebCall receive a text representation of the call results, along with format descriptors that may be used to parse the information, which means to divide the text into small components that can be analyzed. The following is a detailed description of the WebCall computer method and system for integrating EJBs into non-Java environments.

Non-Java Application

The non-Java application 10 in FIG. 1 makes a call 20 to the client library 30 to transmit calling input parameters to invoke a function in the client library. The non-Java application of the present disclosure can be any computing application implementing a business-related functionality written in a non-Java language that requires access to external functionality encapsulated in an EJB, for example a billing application or a database application. The non-Java application may be based on any programming language/computing environment capable of calling external library functions via the C language calling convention. Some examples of language/computing environments for the present disclosure could include a stand-alone FORTRAN program on a midrange computer, or a Visual Basic program running on a personal computer. Some other examples of acceptable programming languages for the non-Java application 10 are C, Pascal, Basic, or ClearBasic.

When the non-Java application 10 makes a call 20 to invoke a function in the client library 30, the calling code establishes parameters used to transfer information/data between the non-Java application 10 and the client library 30. Parameters are defined as fixed amounts of memory used to hold the data being transferred. Parameters used only for transferring data from the non-Java application to the client library function are known as input parameters. Parameters used only for transferring data from the client library function to the non-Java application are known as output parameters. Some parameters are used as both input and output parameters. The amount of memory associated with each parameter is related to its purpose. Some parameters will have only enough memory to hold a single data value as dictated by the programming language/environment. Others, particularly output parameters, may be a much larger size chosen by the non-Java application. These large output parameters are referred to as buffers. The size of each buffer may be subject to limitations imposed by the programming language/environment in which the non-Java application is written.

Client Library

The client library 30 is a module of code for WebCall related functions. Non-Java application 10 interfaces with the client library 30 to make a call 20 to those WebCall related functions found within the client library 30. The client library 30 is the client side interface of the present invention.

In an embodiment, the client library 30 is a linkable library that exposes an API (Application Programming Interface) to allow the applications to make method calls on an EJB 80 and the objects they return. The client library API is based on the C calling convention, and as mentioned previously any programming language that supports the C calling convention may make a call 20 to the client library 30. The client library 30 may be implemented as a single shared object library file named libWEBCALL.so on any platform, for example Sun Microsystem's Solaris 2.6 Unix operating system. In an embodiment, the client library 30 can be deployed by copying the file to a location where the client-side, non-Java application 10 can access it. For example, the deployment location could be a directory in the path that non-Java application 10 will search when dynamically loading code.

In an embodiment, the code within the library is in standard C, provided however that the library can optionally be built for other platforms/languages supporting the C based calling convention. The client library 30 is deployed with the client non-Java application 10 and is dynamically linked to that application. Consequently, the library executes as part of the client application's process. The client library 30 then communicates with the EjbServlet 50 via the HTTP protocol 40.

The client library 30 is comprised of a collection of functions, collectively the WebCall API, such as a webCall function, a webCallSession function, and webCallSetLogging function. The first two functions are both embodiments of the present disclosure for calling EJB 80. The webCall function is a 'one shot' call/return procedure used to retrieve the resulting data of a specific call to a desired EJB, whereas the webCallSession function is an iterative return procedure used to retrieve the desired EJB data in a series of truncated segments. The webCallSessions function can be used optionally when the buffer size is too small for a complete 'one shot' retrieval of the EJB data and will be discussed in more detail later. The webCallSetLogging function is an optional functionality that is unrelated to calling an EJB. It controls a logging function of the client library 30. The logging function can be defined as the messages written to a file to establish and maintain a running dialogue of such things as operations performed by the client library 30 that can be used for debugging purposes, if desired.

The client library 30 is in communication with the EjbServlet 50 wherein the client library 30 comprises a function (for example, the webCall function) to take the information from the call 20 and convert it into an HTTP request text string and then transfer it to the EjbServlet 50. The client library 30 embeds the relevant input parameters from the call 20 into the HTTP request. Some input parameters are embedded as HTTP headers, while others are embedded in the HTTP message body as lines of text formatted using a 'name equals value' notation. Each 'name' corresponds to an input parameter name and each 'value' corresponds to the value/data of the input parameter. Since the HTTP request is a text string, the client library may desirably convert numeric input parameters to their text representations before embedding them in the HTTP request.

Some of the input parameters passed from the non-Java application 10 to the client library 30 are used to identify the EJB and method, and the address of the EjbServlet 50. The client library can then use the supplied input parameter values to access the desired EJB 80 method. The input parameters passed from the non-Java application to the client library are used to identify the DNS (Domain Name Service) name (or IP address) of the machine that hosts the EjbServlet, the TCP port on which the EjbServlet is listening for requests, the EjbServlet's Uniform Resource Identifier (URI, which is an identifier representing the EjbServlet as deployed on the machine), the information required to identify a specific EJB method, and the sizes of the various buffer parameters. The client library constructs the complete "address" of the EjbServlet by combining the DNS name (or IP address), TCP port, and URI values passed to it by the non-Java application. The non-Java application supplies information to the client library via the call parameter to identify the specific EJB method to be called. Typically, the EjbServlet is deployed on a Java application server that also hosts multiple EJBs. Co-location of the EjbServlet with the EJBs it might call is beneficial, but not required. In an embodiment, the EjbServlet may be deployed on one server and the EJBs deployed on other servers, provided however that such an arrangement is typically avoided due to inefficiency.

The client library 30 later extracts, parses, and converts the returned HTTP response headers and body received back from the EjbServlet 50 into data values compatible with the non-Java application 10, places them into the output parameters provided by the calling code, and returns them to the non-Java application 10. Since the HTTP response headers and body text are strings, the client library may also perform text-to-numeric conversions on the text representations of some numeric values it extracts from the response. The means for transferring information between the client library 30 and the EjbServlet 50 is via an HTTP protocol 40 connection that enables the two devices to communicate across a distributed computing environment.

Information Formatting

The distributed components of the present disclosure, the client library 30 and the EjbServlet 50, act as an adapter between incompatible programming environments, making it possible for a non-Java application 10 to make use of EJBs 80. Typically, when richly formatted information flows between incompatible environments, some type of format transformation occurs so that the information may be used natively in each environment.

In most embodiments of the present disclosure, the kinds of information that flow through the disclosed computing system such as the one shown in FIG. 1 are the parameter values being passed to a specified EJB method (and optional chained methods), and the results of the method invocation(s) being returned back to the client. Since method parameters and return types (including thrown exceptions) can be complex Java objects, the distributed components of the present disclosure desirably rely on some syntactic conventions to help describe the semantics of the information. Chained methods refers to methods provided by a returned object. EJB methods often return objects that represent multiple attributes. For example, a getCustomer method might return a Customer object that contains multiple attributes such as Name, Address, SSN, etc. Some of these attributes may themselves be objects that represent multiple attributes, such as Address, which might contain Street, City, Zip, etc. For example, the method signature specified via the call parameter might include a chained method to retrieve the City of a Customer, like this: "getCustomer(String).getCity( )". Here, the EJB supports a method called getCustomer that returns a Customer object, and the Customer object supports a method called getCity. WebCall allows method calls to be "chained" together in this fashion. Any number of methods can be chained together, limited only by the combination of objects that are possible starting with the object returned by the initial EJB method call. A benefit of chaining is that it can decrease the amount of data returned across the wire, thus improving the efficiency of retrieving the desired data.

The client library 30 organizes returned information generated by the EjbServlet 50 from method calls into two separate text strings: a data string and a format descriptor string. The data string is a text string containing the text representation of all data and/or error information returned from the method call. In situations where a method call returns multiple data values, (such as an array, a vector, or a Java business domain object containing multiple attributes), the text representation of all values are concatenated together within the data string. The text string contains no delimiters or other special characters that are not part of the returned data. To assist the non-Java application in parsing the data string, client library 30 also provides a corresponding format descriptor string. The format descriptor is a text string generated by the EjbServlet containing information about the returned data. Using the format descriptor, the non-Java application can locate (by name) and extract individual values from the data string. More information about the format descriptor syntax is presented in detail later in this disclosure.

Usage

Non-Java applications 10 can use WebCall 5 by directly invoking the client library's webCall function, which consists of the following C functions exposed by the client library 30.

webCall Function Syntax:

```
int webCall(char* host,
            int    port,
            char*  uri,
            char*  call,
            int    callSize,
            char*  data,
            int    dataSize,
            char*  format,
            int    formatSize);
```

This client library 30 WebCall function accepts information about the desired EJB method call from the non-Java application 10 and passes it via HTTP protocol 40 to the EjbServlet 50. It then waits for results returned by the EjbServlet 50 via HTTP protocol 40 and passes them back to the calling non-Java application 10 via the output parameters. Parameter descriptions are provided in Table 1 below. The client library 30 also returns a return code to indicate the status of a call. For example a return code of 0 would indicate that the call completed successfully. Errors encountered within the Client Library 30 are indicated by negative integer values returned by the WebCall API. A return code of –1, –2, or –3 indicates that the return data was truncated signaling to the non-Java application 10 that the webCallSession function desirably could be called rather than the 'one shot' webCall function to enable a complete retrieval of the data. webCallSession will be described in more detail later in this disclosure. Return values representing the status code may be any of the values listed in Table 2 below.

TABLE 1

| | |
|---|---|
| host | Input parameter containing the host name of the server used to access the WebCall EjbServlet. |
| port | Input parameter containing the port number for host. |
| uri | Input parameter containing the Uniform Resource Identifier for the WebCall EjbServlet. |
| call | Input parameter containing multiple pieces of information required to make an EJB method call. All elements of the call string desirably should be concatenated together into a single string so that the individual elements are separated from each other by a newline character (i.e., the ASCII character value 10). Each element of the call string is a keyword/value pair separated by the equals character (=). The call parameter desirably should contain the following elements in the exact order listed below:<br>1. package—the fully qualified name of the Java package that contains the EJB's home interface. |

TABLE 1-continued

| | |
|---|---|
| | 2. homeInterface—the name of the EJB's home interface. The home interface name should not be prefixed with a package name. |
| | 3. jndiName—the name used to locate the EJB via a JNDI (Java Names Directory Interface) lookup. This corresponds to the beanHomeName parameter in the Em's deployment descriptor file. |
| | 4. methodSig—the signature of the EJB method to be called. The method signature consists of the EJB method name, an opening parenthesis character, comma-delimited parameter type names (if applicable), and a closing parenthesis character. The method signature should contain no spaces. The method signature may also contain chained method calls. |
| | 5. methodParams—the text representation of the values to be passed as parameters to the method(s) specified in the method signature. The first parameter value is preceded by the delimiter character that is used to separate the parameter values that follow it. If the EJB method takes no parameters, the entire methodParams element should be omitted. |
| | Below is an example call string. |
| | package=com.sprint.service.account.component |
| | homeInterface=AccountHome |
| | jndiName=Account |
| | methodSig=findInfo(String,String,String,int,String) |
| | methodParams=;John Doe;USA;male;50;555-55-5555 |
| callSize | Input parameter containing the size of the information in the call buffer. |
| data | Output buffer parameter to receive the data from the called method(s). |
| dataSize | Input parameter containing the allocated size of the data buffer. |
| format | Output buffer parameter to receive the format descriptor that describes the individual data values passed back in the data buffer. The format descriptor makes it possible for the caller to locate (by name) and extract individual data values from the data buffer. |
| formatSize | Input parameter containing the allocated size of the format buffer. |

TABLE 2

| | |
|---|---|
| 0 | Call completed successfully. Note that this does not mean that no Java exceptions were encountered during the course of calling the EJB and converting the results to text. |
| −1 | Returned data was truncated to fit into the data buffer. |
| −2 | Returned format descriptor was truncated to fit into the format buffer. |
| −3 | Both data and format descriptor were truncated to fit into their respective buffers. |
| −4 | Communication error. Unable to initiate or complete interaction with EjbServlet. |
| −5 | Memory allocation error. |
| −6 | host is invalid (NULL or empty). |
| −7 | port is invalid (less than 0). |
| −8 | uri is invalid (NULL or empty). |
| −9 | call is invalid (NULL or empty). |
| 10 | callSize is invalid (not greater than 0). |
| −11 | data buffer is invalid (NULL). |
| −12 | format buffer is invalid (NULL). |
| −13 | data and format buffers are invalid (NULL). |
| −14 | dataSize is invalid (not greater than 0). |
| −15 | formatSize is invalid (not greater than 0). |
| −99 | Unknown error occurred (should never happen). |

Method Signature Syntax

The method signature element formed by the client library 30 is a text string that desirably conforms to the following format:

methodSig=EjbMethodName(ParameterType, ParameterType, . . . , ParameterType)

As demonstrated above, the method signature value consists of the EJB method name, an opening parenthesis character, comma-delimited parameter type names (if applicable), and a closing parenthesis character. The method signature contains no spaces or other extraneous characters. If the EJB method takes no parameters, the parentheses are present, but empty.

Parameter types are classified as simple or complex. The simple parameter types supported by WebCall 5 include the following Java data/object types: String, StringBuffer, int, Integer, short, Short, long, Long, boolean, Boolean, float, Float, double, Double, char, Character, byte, and Byte. WebCall 5 will recognize these parameter type names. They can be used 'as-is' directly in the method signature.

The complex parameter types supported by WebCall 5 include: Java arrays, Java Vectors, and Java Objects. WebCall 5 requires a special syntax to assist in properly creating and initializing objects of these types.

Array and Vector parameter types desirably should conform to the following formats:

ElementType[ElementCount] . . . [ElementCount]
   Example: String [25][2]
   Example: mypackage.Account(String,String)[20]
   Vector(ElementType)[ElementCount] . . . [ElementCount]
   Example: Vector(int)[100]
   Example: Vector(mypackage.Account(String,String)) [100]

Within the (required) brackets, ElementCount is a positive integer indicating how many elements the array or Vector will contain, and ElementType is the data type of each element (all elements will be this type). ElementType can be any simple or complex parameter type supported by WebCall.

Object parameter types desirably should conform to the following format:

Package.ObjectClass(ParameterType, ParameterType, . . . , ParameterType)

Example: com.sprint.sales.Account(String,String,String, int)

Any parameter type in the method signature that is not recognized as one of the simple, Array, or Vector types will be evaluated to see if it is a reference to a Java object class. To be successfully recognized, the parameter type desirably should consist of a valid, fully qualified Java class name, an opening parenthesis character, comma-delimited parameter type names (if applicable), and a closing parenthesis character. The ParameterType names within the parentheses are used to find a matching constructor defined in the objects class. Each ParameterType can be any simple or complex parameter type supported by WebCall. If the desired constructor takes no parameters, the parentheses should be empty.

Method Chaining

Additional method calls may also be appended onto the end of the method signature in a manner similar to the method call chaining syntax supported by Java. For example, method signatures of the following form would be valid:

methodSig=EjbMethod(types).Method1(types).Method2 (types)

Here, EjbMethod( ) is called on the EJB, then Method1( ) is called on the object returned by EjbMethod( ), and then Method2( ) is called on the object returned by Method1( ). Any extra parameters for the additional methods are simply concatenated (in order) to the end of the methodParams element.

Use of this method-chaining feature is optional. When used, its syntax is consistent with syntax described above. Each appended method desirably should consist of the method name, an opening parenthesis character, comma-delimited parameter type names (if applicable), and a closing parenthesis character. Each appended method is separated from the closing parenthesis of the previous method by a period. No spaces or other extraneous characters should be included. If an appended method takes no parameters, the parentheses should be present, but empty.

Member Classes as Method Parameter Types

Special care desirably should be taken when an EJB method accepts member class parameters (a member class is a non-static inner class). Every instance of a member class implicitly refers to an instance of the class that contains it. The Java compiler automatically inserts a private field in the member class to hold a reference to the containing object. The compiler also automatically inserts a hidden parameter to all constructors of the member class and passes the containing object as the value of this parameter. As described earlier, WebCall 5 desirably should construct the parameter objects that will be passed to the EJB method before calling it. Web-Call 5 does this by using reflection to obtain a reference to a constructor object for each method parameter. In the case of member classes, WebCall 5 can construct an instance of an inner class parameter using a constructor defined by the inner class. Consequently, the method signature can accurately indicate which constructor to use by including the hidden parameter type at the beginning of the constructor's parameter type list.

Method Parameters Syntax

The method parameters element is a text string that desirably should conform to the following format:

methodParams=Value, Value, . . . , Value

As demonstrated above, the method parameters value consists of a delimiter character followed by parameter values separated by the delimiter character. A parameter value desirably should be provided for every method parameter that occurs in the method signature. If the method(s) in the method signature take no parameters, the entire methodParams element should be omitted from the information passed into the WebCall API.

Any character other than the newline character (ASCII value 10) can be used as the delimiter between parameter values. In the format example above, a comma is used as the delimiter. The delimiter desirably is chosen so that it does not match any of the characters in the parameter values. For parameters that are simple types, the parameter value will be the string representation of the value. For parameters that are arrays or vectors of simple types, the parameter value will be a sequence of the string representations of each array/vector element value separated by the specified delimiter. For parameters that are object types, the parameter value will be a sequence of string representations of values separated by the specified delimiter. These values will be assumed to be constructor parameters that will be used to create an instance of the associated object type.

For arguments that are arrays or vectors of object types, the parameter value will be sequences of string representations of values separated by the specified delimiter. These values in these sequences will be assumed to be constructor parameters that will be used to create each instance of the specified object type. Parameter values can not contain the newline character. "Empty" values can be specified for String and StringBuffer type parameters that contain no characters. WebCall interprets empty values for String and StringBuffer type parameters as nulls. "Empty" values can also be specified for object type parameters with constructors that take no parameters. A delimiter typically precedes empty values. In situations where only one parameter value is required and the parameter value is empty, the body of the methodParams element desirably should still begin with a delimiter although an empty value (i.e., nothing) follows it.

EjbServlet: Input Object

The EjbServlet 50 in FIG. 1 is a Java servlet that calls a specified EJB 80 method (and possibly additional chained methods) and returns the result via HTTP 40. All of the EJB-related work performed by the present disclosure takes place within the EjbServlet 50. In an embodiment, the Ejb-Servlet 50 is based on the javax.http.servlet.HttpServlet class. The EjbServlet 50 can be deployed on any suitable Java application server, for example, it can be deployed on a web server or application server that supports Servlet 2.0 (or greater) API and utilizes Java version 1.2 (or greater). In an embodiment, the EjbServlet 50 may be deployed on a WebLogic Server. In an alternate embodiment, the EjbServlet 50 may be deployed on an IBM Java application server such as WebSphere.

The EjbServlet 50 is configured to accept an HTTP request from the client library 30, further comprising extracting the input parameter information (including the method signature and method parameters) out of the structures used to carry it through the HTTP protocol 40, encoding or converting the extracted information into zero or more Java objects for invoking EJB 80, and identifying the method being called by the client from the encoded parameters. EjbServlet 50 then transfers the encoded objects to EJB 80. The EjbServlet 50 extracts the information from the HTTP structures as text only. Some of that information may represent parameters that are to be passed into the EJB method. As known to those of skill in the art, when a method is called in Java, often some of the parameters to be passed into the method may or may not be required to be in Java object form. Therefore, when the EjbServlet 50 recognizes that the method it will call requires passing input Java objects, EjbServlet 50 then takes the text representing that parameter and creates a Java input object that represents that text. Likewise, when an object is not required, none is created by the EjbServlet 50. The input object is constructed by the EjbServlet 50 and passed to the EJB 80 for the purpose of invoking the method. The number of input objects corresponds to the number of inputs required for the method being invoked on the EJB The EjbServlet 50 requires information about the parameter values being passed to the specified method(s) that it will call on behalf of the client. The EjbServlet 50 as part of its API call parameter encodes this information, which is the method signature. The method signature, as described earlier, is comprised of the EJB method name followed by parentheses that enclose comma-separated data type names for each parameter expected by the method. It looks much like any Java method declaration. It may also contain additional method names with their own parameter type lists. The EjbServlet 50 uses the method signature to convert the method parameter values supplied by the client from their text representations into the appropriate Java objects expected by the method(s).

EjbServlet: Encoding-Text-to-Object Conversions

The EjbServlet 50 converts text strings passed through its calling function API (API call) into Java objects to convert the text corresponding to the method parameter values into the Java data types specified in the method signature. This occurs according to the technique used to call the method(s). Part of the text passed through the calling interface is used by the EjbServlet 50 to create a Java object representing an instance of the EJB. Then, a Java Reflection API may be used to obtain a reference to a Method object corresponding to the EJB method specified in the signature. The Reflection API is a means provided by Java to allow programs to dynamically discover, create, and make use of objects at runtime rather than hard-coding these activities into the programs. For example, a program could be written to statically create and manipulate a Person object. Alternatively, the program could be written to use the Reflection API to dynamically create and manipulate a Person object, or any other object by passing the name of the object's type to the program at runtime. This capability can be beneficial to the EjbServlet because it is designed to have no prior knowledge of the EJBs/methods it will interact with, thus making it a generically applicable EJB calling mechanism.

The Method object is an object provided by the Reflection API. All Method objects support a method named invoke that calls the underlying method represented by the Method object on the specified object with the specified parameters. Before this call can be made, the method parameters passed in by the client desirably are converted from text strings to Java objects based on the data types specified in the method signature. If the method signature also contains chained methods, similar conversions will be performed for them as well. The EjbServlet 50 performs these conversions using the following techniques:

1. All parameter values that are a primitive data type are converted to the equivalent Java primitive wrapper object. For example, a parameter string representing an int will be converted to a Java Integer object, a char parameter will be converted to a Java Character object, and so on. This object wrapping is a requirement of the invoke method.
2. All parameter values that are a primitive wrapper data type are converted to the specified primitive Java wrapper object.
3. All parameter values that are a Java String or StringBuffer data type are converted to a Java String or StringBuffer object.
4. All parameter values that are a Java array type are converted to a Java array. The method signature passed through the WebCall API uses a special syntax to indicate array types that includes the number of elements that are being supplied for the array, and the data type of the array elements. In Java, all array elements desirably should have the same data type.
5. All parameter values that are a Java Vector data type are converted to a Java Vector. The method signature passed through the WebCall API uses a special syntax to indicate Vector types that include the number of elements that are being supplied for the Vector, and the data type of the Vector elements. It is assumed that all elements are of the same data type.
6. All parameter values that are any other data type are assumed to be Java objects. The method signature passed through the WebCall API uses a special syntax to indicate object types that include the data types of the parameters passed to the constructor that will be used to create the object. Any Java object referenced in the WebCall API method signature as a parameter for a method desirably should have a constructor capable of creating and sufficiently initializing the object.

EjbServlet: Return Object

The EjbServlet 50 is further configured to receive a returned Java object from the EJB 80, decode or convert the returned object into data and format descriptor text strings, and then place these strings, along with other information, into the HTTP response. The data and format descriptor strings are streams of characters that represent the object that was returned by the method call. For example, if the method call returns an Account Java object, the object may have multiple attributes such as name, address, phone number, and other such attributes. That one object can then be converted into four or five distinct data values (or however many data values for the corresponding number of attributes within the object). Those values are then converted into a string of data that is returned as a string of text with name, address, and phone number blocked together one after another. The format descriptor string contains tags that are separated by brackets. Each tag comprises four fields such as type, name, start position, and length. The format string can then be used later by the non-Java calling application 10 to locate the data values in the corresponding data string.

Additionally, the EjbServlet 50 does not have access to the output buffers passed by the non-Java application 10 to the client library 30. The information that flows between the client library and the EjbServlet is embedded within HTTP Requests and HTTP Responses. The client library extracts the data and format descriptor strings from the HTTP response into the respective output buffers supplied by the non-Java application. The client library typically does not perform any conversions on these strings as it extracts them.

The return object corresponds to the output of the method on the EJB 80. As known to those of skill in the art, there is always either zero or one object returned by an EJB method.

This is a fundamental characteristic of all Java methods and is not unique to WebCall. However, a return object may be internally composed of multiple other Java objects as demonstrated by the example above. Thus, the decoding or deconstruction of one return object can result in multiple atomic data values. The HTTP response string constructed by the EjbServlet 50 may contain other information in addition to containing data and format strings resulting from the decoding of the object returned from the EJB method call. This information may include various HTTP-related control information, the lengths of the data and format strings, an EjbServlet error code, an EjbServlet version ID, and (in the case of WebCallSession only) a session ID. The EjbServlet 50 then may transfer the response back to the client library 30 across the HTTP 40 connection.

EjbServlet: Decoding-Object-to-Text Conversions

In an embodiment of the present disclosure Java objects are converted to strings by the EjbServlet 50 to convert the Java object returned by the called method(s) into the data text string that is returned to the client library 30. The EjbServlet 50 performs this conversion (known as decoding) using the following algorithm:

1. If a method invocation throws an exception of any class based on Java's Exception class, the generated exception object is caught and converted to a string by calling the object's toString method. The string is then concatenated to the data string.
2. If the returned object type is one of Java's primitive wrapper object types or a Java StringBuffer object, it is converted to a string by calling the object's toString method. The string is then concatenated to the data string.
3. If the returned object type is a Java String, no conversion is necessary since it already represents a text string. The string is simply concatenated to the data string.
4. If the returned object type is a Java array type, each element of the array is converted to a text string by one of the algorithms presented in this list. As each element is converted, it is concatenated to the data string.
5. If the returned object type is a class that implements the Java 1.2 Collection or Map interfaces, each element of the Collection/Map is converted to a text string by one of the algorithms presented in this list. As each element is converted, it is concatenated to the data string.
6. If the returned object type does not correspond to any of the preceding types, it is assumed to be a "complex" Java object. The complex object is converted to a string by converting the returned values of each accessor method defined by the object's class. Accessor is defined in the following paragraph.

This decoding process begins by using the Java Reflection API to obtain a list of all Methods declared by the class or interface that the returned object represents. Next, each Method is examined to determine if it is an accessor. Each Method is assumed to be an accessor if it meets the following criteria:

1. It is defined in the object's class as public.
2. It takes no parameters.
3. It has a non-void return type.
4. Its name is not toString.
5. The class type of the object returned by the Method does not match the class type of the object being decoded unless the Method's return type is a direct or indirect superclass or superinterface of the object being decoded.
6. The class type of the object returned by the Method is not an array or Collection containing elements that match the class type of the object being decoded unless the type of elements in the Method's returned array/collection are direct or indirect superclass or superinterface of the object being decoded.

All methods meeting these criteria are called via invoke, and the returned objects (or exceptions) are converted to a text strings by one of the algorithms presented above. As each object returned by an accessor is converted, it is concatenated to the data string.

Converting a complex object to a text string can cause this algorithm to be executed recursively to break down complex objects into constituent elements that can be converted to text. As each text conversion occurs, format descriptor tags are generated and appended to the format descriptor string. Consequently, there is a one-to-one relationship between format descriptor tags and the individual data values in the data string. Each tag in the format descriptor contains sufficient information to indicate the following:

1. The name of the individual data value.
2. Whether it is an exception message, a single value, or an element of an array, Collection, or Java object.
3. Its position in the data string.
4. Its size.

EjbServlet: Error Handling

Errors encountered during Java method calls are generally manifested in the form of Java Exceptions. The EjbServlet 50 will catch all exceptions based on the Java Exception class that are thrown during the course of either calling a method or converting the results to text format. When an exception is caught, the format descriptor will contain an exception tag indicating that the text in the data string is an exception message rather than a valid data value.

As previously described, all calls to methods specified in the method signature are actually made by calling the invoke method of the java.lang.reflect.Method class. If a method called by invoke completes abruptly by throwing an exception, invoke embeds this exception in an InvocationTargetException which is thrown in turn to the caller of invoke (i.e., EjbServlet 50). In this situation, EjbServlet 50 retrieves the embedded method exception from the InvocationTargetException and returns any available information about the embedded exception. The associated format descriptor will then indicate that an exception has been returned rather than valid data.

Exceptions can also occur during subsequent Java method calls that might be required to convert the returned object to text. A specific example of this is when a Java object is converted to text by calling its accessors. In this scenario, it is possible that some accessor calls will complete without error, and some will not. In this situation, WebCall 5 makes no judgment on the validity of the object being converted. It is assumed that the designer of the object has a reason to allow some accessors to complete successfully while others fail. In any case, the data and format descriptor strings returned by WebCall 5 will accurately reflect what happened.

EjbServlet: Encoding Alternatives

In an embodiment, the syntactic conventions required by the WebCall API consider that data passed to and from Java methods are inherently variable in size and complexity. Consequently, the method signature and format descriptor describe incoming and outgoing data respectively. These descriptions are passed along with the data each time an EJB method call is made via WebCall 5. This can impose additional network traffic between the non-Java application 10 and the EJBs 80 it uses. In an alternate embodiment, the conventions could be based on fixed-length encoding. This may require that mapping information be maintained for each desired method that describes how the EjbServlet 50 should convert between Java data objects and fixed size strings representing data values. This mapping information can be maintained on both the client 2 and the server 4, eliminating the need to transmit data formats back and forth. With fixed-length encoding, some per-call descriptive information may be desirable in situations where an invoked method returns an object that contains arrays or collections of varying sizes. Because of this, a variable-length encoding scheme relying on format information could be the desired convention. Techniques are available to help overcome any issues exacerbated by the WebCall variable-length encoding scheme. For example, if the class of the object returned by an EJB method call defines a toString( ) method that returns a String, the client can indicate that WebCall 5 should call this method on the object returned by the EJB method rather than converting the results of (potentially) multiple accessor calls. This reduces the number of format descriptor tags required for the object to one. The non-Java application 10 desirably should know how this single string is formatted and parse it accordingly. In another embodiment, EJBs can be based on a Facade pattern (a pattern that is based on multiple values that are fixed-length and encoded in a single text string) to impose a simpler interface between the client 2 and business logic EJBs 80. A Façade interface such as this may help to reduce format descriptor sizes. This technique can also prevent undesirable modifications or extensions to the interfaces of existing EJBs 80.

EjbServlet: Format Descriptor Syntax

The format descriptor tags are the following:

| | |
|---|---|
| <f name pos size> | a Field corresponding to a simple value |
| <e name pos size> | an Element of an array or Collection |
| <x name pos size> | an eXception |
| <u name pos size> | Unknown (should never happen) |

Each of these tags contains the item's name, its position in the data string, and its length.

The pos portion of the tag is a non-negative integer that indicates the position of the associated value in the data string. In effect, it is a zero-based index into the data string returned along with the format descriptor. Position 0 is the first character, position 1 is the second character, and so on.

The size portion of the tag is a non-negative integer that indicates the size of the associated value in the data string. Data values may have a size equal to or greater than zero. A size of zero indicates that the associated data value is either an empty String/StringBuffer object, or a null object.

The name portion of the tag will be (at a minimum) the name of the method called to access the data value associated with the tag. For method calls that return a simple value, the associated Field tag that is returned in the format descriptor will look like <f EjbMethodNane 0 32>. For method calls that return complex types, the name portion of the tag will contain additional information as described below.

If the method returned an array or collection, multiple Element tags will be present in the format descriptor—one for each element in the array/collection. Each Element tag name will be the name of the method that returned the array/collection plus an index specifier indicating the ordinal position of the associated data value in the array/collection. For example, <e getNames[2] 216 32> indicates that the value of the third element of the array returned by a call to getNames starts at the $217^{th}$ character in the data string, and the value is 32 characters long.

If the method returned an object, multiple Element tags will be present in the format descriptor—one for each accessor called to retrieve the data values of the object. Each Element tag name will be the name of the method that returned the object plus the name of the accessor object called to get the associated data value. For example, <e getCustomer.getSSN 11 9> indicates that the value returned by the getSSN accessor of the object returned by getCustomer starts at the $12^{th}$ character in the data string, and the value is 9 characters long. If the object returned by getCustomer has another accessor named getNumbers that returns an array or collection, the format descriptor would have an additional Element tag for each element of the returned array/collection. For example, <e getCustomer.getNumbers[1] 140 10> would indicate that the value of the second element of the array/collection returned by getNumbers for the object returned by getCustomer starts at the $141^{st}$ character in the data string, and the value is 10 characters long.

If a called method throws an exception based on the Java Exception class, the text string returned by the exception's toString method will be returned as the data string value corresponding to the call. An associated Exception tag will be present in the format descriptor. The name portion of the tag will be (at a minimum) the name of the called method that generated the exception. In the case of exceptions thrown by accessors or object/text conversions, the name will be prefixed with the name of the method that returned the parent object. For example, if the previous getCustomer.getSSN example threw an exception, the associated tag would look like <x getCustomer.getSSN 11 30>.

Remote Method Interface (RMI)

In FIG. 1, the Remote Method Invocation (RMI) 60, for invoking and returning Java objects between the EjbServlet 50 and the EJB 80, is a set of protocols developed by Sun's JavaSoft division that enables Java objects to communicate remotely with other Java objects. RMI is a relatively simple protocol written in standard Java code, but unlike more complex protocols such as CORBA and DCOM that are designed to support objects created in any language, RMI works only with Java objects. RMI 60 in FIG. 1 enables server 4 to run across a distributed computing environment if desired, in which EJBs can run in a separate process space from the calling application. For example, the EjbServlet 50 could be located in Kansas City and the EJB 80 could be located in Dallas.

Sequence of Events for a WebCall Function

In general, the sequence of events for a 'one shot' webCall function of the present disclosure can occur as follows. In FIG. 1, non-Java application 10 makes a call 20 to the client library 30 API, passing it parameters that indicate the name and location of the EjbServlet 50, the method name or signature of the method(s) to be called, and the values to be passed as the method parameters. The client library 30 translates the information passed to it into an HTTP request 40 and sends the request to the EjbServlet 50. The EjbServlet 50 encodes the WebCall-related information extracted from the HTTP request 40 received from client library 30 and calls (via RMI 60) the specified method of the specified EJB 80 using the specified parameter values and constructing input objects as needed. If necessary, EjbServlet 50 makes the additional chained method call(s) on the returned object(s). The EjbServlet 50 translates the object returned by the method call(s) into two text strings: a raw text string containing the data, and a companion format descriptor string that describes the format of the data string. The EjbServlet 50 assembles the data and format strings into an HTTP response 40 and sends the response to the client library 30 via RMI 60. The client library 30 extracts the format descriptor and data strings from the HTTP response 40 and passes them as output parameters to the non-Java application 10 that initiated the call. In an alternate embodiment the EjbServlet 50 can be accessed without using the client library 30. For example, the EjbServlet 50 can be invoked via HTTP from a client application that is written in Java. This approach is similar in concept to Web Services, and can be advantageous in situations where direct RMI calls to EJBs are complicated by the presence of firewalls.

webCallSession Function

In an alternate embodiment, the webCallSession function of the WebCall API can be accessed by the non-Java application 10 to iteratively retrieve large results from an EJB 80 in truncated sections. Like the webCall function, the webCallSession function accepts information about the desired EJB method call and passes it via HTTP protocol 40 to the EjbServlet 50. It then waits for results returned by the EjbServlet 50 via HTTP 40 and passes them back to the calling non-Java application 10 via the return parameters.

The webCallSession function can be used in situations where the amount of decoded information returned by an EJB method call could possibly exceed the size of the buffers used to receive it. Before making the initial call, the non-Java application 10 desirably has knowledge of the size of the results from the EJB 80 it is calling and can therefore be aware, up front, of whether or not to call the webCall function (for small EJB results) or to call the webCallSession function (for large EJB results). For example, the non-Java application 10 could call the webCall function when retrieving a small amount of information such as an accounting function to get an address from a user account. Alternatively, the non-Java application 10 could call the webCallSession function when retrieving a large amount of information such as the total usage by a user account for the past ten years. Those skilled in the art typically can determine whether to use webCallSession when developing an application based on the buffer size limitations imposed by their programming language/environment, and knowledge of the volumes of data returned by the various EJB methods. WebCall imposes no special limitations on buffer size. The client library makes use of the buffers that are allocated by the calling application regardless of their size. If the programming language/environment of the calling application imposes no meaningful limitations on buffer size, then the developers skilled in the art can choose a buffer size that will be large enough for the desired retrieval. In such a case, webCallSessions would not be used. However, even when there are no imposed limitations, the developers can choose to use smaller buffers and perform iterative retrieval so that the application can perform other work during each iteration. For example, the application may update a "Retrieval Status" display for the user between webCallSession calls so that the system does not appear to have died during the retrieval of large volumes of data.

When accessing large results from an EJB 80, the webCallSession function can be called repeatedly (i.e., in a loop) to retrieve the results. During the first iteration of the loop, the call to webCallSession causes the EJB method to be called. Part (or possibly all) of the data and format strings are returned along with their sizes. If only part of the data and/or format string was returned, the status code returned will indicate that webCallSession should be called again (perhaps multiple times) to get the remaining results. The status code returned by webCallSession indicates whether webCallSession needs to be called again. The status code is an integer. If it is 1, another call needs to be made. If it is 0, no more calls are required. If it is less than 0, some type of error occurred. All subsequent calls simply return the next portions of the data and/or format strings. The EJB method is only called once by the first webCallSession call. During a session, the EjbServlet 50 stores the decoded EJB method call results in memory on the server. It then uses the session ID as a 'key' to access the stored results.

Non-Java applications 10 use the client library 30 webCallSession function by directly invoking webCallSession, which consists of the following C function exposed by the client library 30. Parameter descriptions are provided in Table 3. Again, the return value is a status code as described earlier and may be any of the values listed in Table 4.

```
int webCallSession(char*  host,
                   int    port,
                   char*  uri,
                   char*  call,
                   int    callSize,
                   char*  data,
                   int*   dataSize,
                   char*  format,
                   int*   formatSize,
                   char*  sessionID,
                   int    IDsize);
```

TABLE 3

| | |
|---|---|
| host | Same as WebCall function. |
| port | Same as WebCall function. |
| uri | Same as WebCall function. |
| call | Same as WebCall function. |
| callSize | Same as WebCall function. |
| data | Same as WebCall function. |
| dataSize | Same as WebCall function with one exception: Upon return, dataSize will contain the size of the information returned in the data parameter. Consequently, this parameter desirably should be passed by reference, not by value. |
| format | Same as WebCall function. |
| formatSize | Same as WebCall function with one exception: Upon return, formatSize will contain the size of the information returned in the format parameter. Consequently, this parameter desirably should be passed by reference, not by value. |
| sessionID | Output/input buffer parameter to contain the session ID. For the first call of a session, this parameter desirably should contain a NULL character (ASCII 0) at the beginning of the buffer. Upon completing the first call, this parameter will contain a sequence of characters that desirably should be used in subsequent calls in the session to retrieve the remaining portions of the data and/or format strings. |
| IDsize | Input parameter containing the allocated size of the sessionID buffer. The minimum allowable size is 300. This size should be sufficient for most situations. |

TABLE 4

| | |
|---|---|
| 1 | Call completed successfully. Partial data and/or format information was returned. |
| 0 | Call completed successfully. All data and format information has been returned. |
| −1 | Returned data was truncated to fit into the data buffer. |
| −2 | Returned format descriptor was truncated to fit into the format buffer. |
| −3 | Both data and format descriptor were truncated to fit into their respective buffers. |
| −4 | Communication error. Unable to initiate or complete interaction with EjbServlet 50. |
| −5 | Memory allocation error. |
| −6 | host is invalid (NULL or empty). |
| −7 | port is invalid (less than 0). |
| −8 | uri is invalid (NULL or empty). |
| −9 | call is invalid (NULL or empty). |
| −10 | callSize is invalid (not greater than 0). |
| −11 | data buffer is invalid (NULL). |
| −12 | format buffer is invalid (NULL). |
| −13 | data and format buffers are invalid (NULL). |
| −14 | dataSize is invalid (NULL or not greater than 0). |
| −15 | formatSize is invalid (NULL or not greater than 0). |
| −16 | sessionID buffer is invalid (NULL). |
| −17 | IDsize is invalid (less than 300). |
| −99 | Unknown error occurred (should never happen). |

Sequence of Events for a webCallSession Function

In general, the sequence of events for an iterative webCallSession function of the present disclosure can occur as follows. In FIG. 1, non-Java application 10 makes a call 20 to the client library 30 webCallSession function, passing it parameters that indicate the name and location of the EjbServlet 50, the method name or signature of the method(s) to be called, the values to be passed as the method parameters, buffers to contain the results of the EJB method call, a buffer to contain a session ID (key), and the sizes of the buffers. The client library 30 translates the information passed to it into an HTTP request 40 and sends the request to the EjbServlet 50. The EjbServlet 50 encodes the HTTP request 40 received from client library 30 and calls (via RMI 60) the specified method of the specified EJB 80 using the specified parameter values and constructing input objects as needed. If necessary, EjbServlet 50 makes the additional chained method call(s) on the returned object(s). The EjbServlet 50 translates the object returned by the method call(s) into two text strings: a raw text string containing the data, and a companion format descriptor string that describes the format of the data string and places all or part of this information into the HTTP response. The EjbServlet 50 stores any remaining decoded EJB method call results that do not fit the size of the returning buffers into memory on the server, sets the return code value to indicate that the return data being passed back was truncated, and attaches a key for identification purposes to the stored data. It then assembles the truncated data and format strings, along with a matching key to be used to retrieve the remaining data, and the return code into an HTTP response 40, and sends the response to the client library 30 via HTTP. The client library 30 extracts the format descriptor and data strings (including the key and return code) from the HTTP response 40 and passes them as output parameters to the non-Java application 10 that initiated the call. The non-Java application 10 accepts the returned information and then reads the return code to determine if the data retrieved has been truncated. If the return code is 1 (indicating the return data has been truncated) a subsequent call is made by the non-Java application 10, furthermore, passing the key back to the client library 30 and on to the EjbServlet 50 via HTTP. The EjbServlet 50 uses the passed identification key to locate the remaining stored encoded EJB return data by matching the passed key to the key stored with the remaining information. After a match is found, the EjbServlet 50 places the additional information into the HTTP Response, determines a new return code to indicate if the new batch of data is again truncated or is complete, and then passes the additional information along with the same key back to the client library 30 and on to the calling non-Java application 10. Subsequent calls will continue to be made to the return information stored on the EjbServlet 50 until all of the data is retrieved which would then be indicated by a return code of 0.

webCallSetLogging Function

The webCallSetLogging function, callable by the non-Java application 10, allows the specification of a file to receive logging output from the client library 30. If not called, all logging output is directed to a console. This is an optional function within the client library 30 and may be executed in combination with one of the other library functions such as the webCall function or the webCallSession function. The syntax of the function follows with the parameter description in Table 5 and the possible return values listed in Table 6.

int webCallSetLogging(char*logfile);

TABLE 5

| | |
|---|---|
| logfile | Input parameter containing the path/name of the file to which the client library should log its messages. |

TABLE 6

| | |
|---|---|
| 0 | Logging destination could not be set as specified. |
| 1 | Logging destination successfully set as specified. |

EXAMPLES

Although only a few embodiments of the present invention have been described herein, it should be understood that the present invention may be embodied in many other specific forms without departing from the spirit or the scope of the present invention. The present examples above and as follows are to be considered as illustrative and not restrictive, and the invention is not to be limited to the details given herein, but may be modified within the scope of the appended claims along with their full scope of equivalents. The examples that follow are included to demonstrate various embodiments of the present disclosure. The examples include demonstrations of making calls to the three client library functions, the webcall function, the webCallSessions function, and the webCallSetLogging function. Also included are examples of deployment of the EjbServlet, method signatures and method parameters, and parsing the format descriptor.

Example 1

The following example demonstrates an application making a call to the webCall function of WebCall 5 that has been described in the present disclosure. The call typically can be made using any non-Java language but for demonstration purposes a pseudo-code is shown. The example shown sets up the call string, allocates the buffers, and makes the call to the EJB method. Note that the 'int code' is the return value representing the status code.

//Set up the call string

String call[1000]

String newline=CHR(10)//linefeed character
call="package=com.sprint.service.account.component"+
    newline+"homeInterface=AccountHome"+newline+
    "jndiName=Account"+newline+"methodSig=findInfo
    (String,String,String,int,String)"+newline+
    "methodParams=,John Doe,USA,male,50,555-55-5555"

//Allocate buffers for data and format descriptor int bufSize=60000

String data[bufSize]

String format[bufSize]

//Call EJB method int code=webCall("IDServer.corp.sprint.com", 80, "EjbServlet", call, call.length( ), data, bufSize, format, bufSize)

if(code==0)
    getData(data, format)
else
    errorMessage(code)

Example 2

The following example demonstrates an application making a call to the webCallSession function of WebCall 5 that has been described in the present disclosure. Again, the call typically can be made using any non-Java language but for demonstration purposes a pseudo-code that is similar in form to Visual Basic is shown. The example shown sets up the call string, allocates the buffers, makes the initial call to the EJB method, and sets up a loop to get the results.

'Declare some useful types and variables

Const WebCallBufferSize as Integer=30000

Type WebCallResults
    dataBuf as String*WebCallBufferSize
    dataLen as Integer
    dataPos as Integer
    formatBuf as String*WebCallBufferSize
    formatLen as Integer
    formatPos as Integer
    status as Integer End Type Dim results(3) as WebCallResults Type WebCallValue
    tagType as String
    name as String
    pos as Integer
    size as Integer
    data as String End Type

'--------------------------------------------------------------------

Sub sessionCall(String host, Integer port, String uri, String call, Integer callSize)
    ' Declare variables
    Dim n as Integer
    Dim f as Integer
    Dim d as Integer
    Dim min as Integer
    Dim max as Integer
    Dim sessionID as String*300
    Dim tagEnd as Integer
    Dim tagEnd as Length
    Dim tag as String
    Dim value as WebCallValue
    Dim valueLen as Integer
    ' Initialize variables
    min=LBound(results)
    max=UBound(results)
    For n=min To max
    results[n].dataBuf=Chr$(0)
    results[n].dataLen=WebCallBufferSize
    results[n].dataPos=1
    results[n].formatBuf=Chr$(0)
    results[n].formatLen=WebCallBufferSize
    results[n].formatPos=1
    Next n
    value.tagType=" "
    value.name=" "
    value.pos=0
    value.size=0
    sessionID=Chr$(0)
    n=min
    status=1
    ' Get the results
    while n<=max And status>0
    results[n].status=webCallSession(host, port, uri, call, callSize, results[n].dataBuf, results[n].dataLen, results[n].formatBuf, results[n].formatLen, sessionID, 300)
    status=results[n].status
    n=n+1
    Wend
    ' Parse the results
    f=min
    d=min
    status=1
    tag=" "
    while f<=max And d<=max
    tagEnd=InStr(results[f].formatPos, results[f].formatBuf, ">")
    If tagEnd< >0 then
        tagLength=tagEnd−results[f].formatPos+1
        tag=tag & Mid$(results[f].formatBuf, results[f].formatPos, tagLength)

```
results[f].formatPos=tagEnd+1
value.tagType=Left$(tag, 2)
value.name=Item$(tag, 2, 2, ">")
value.pos=Val(Item$(tag, 3, 3, ">"))
value.size=Val(Item$(tag, 4, 4, ">"))
Do
    value.data=value.data & Mid$(results[d].dataBuf,
        results[d].dataPos, value.size)
    valueLen=Len(value.data)
    If valueLen>=value.size Then
        results[d].dataPos=results[d].dataPos+dataLen
    Else
        d=d+1
    End If
Loop while valueLen<value.size And d<=max
    ' Here, value.data has the complete value string cor-
        responding to value.name.
    ' Do something with it (insert your code/call here) . . . .
    ' Reset tag and value variables for next iteration
    tag=" "
    value.data=" "
Else
    tag=tag & Mid$(results[f].formatBuf, results[f].format-
        Pos)
    f=f+1;
End If
Wend ' Loop to do the next tag/value
End Sub ' sessionCall( )
```

Example 3

The following example demonstrates an application making a call to the webCallSetLogging function of WebCall 5 that has been described in the present disclosure. As mentioned previously, the call typically can be made using any non-Java language but for demonstration purposes a pseudo-code is shown. The example shown sets up a file to store logging information on the client library that could be accessed by the non-Java application programmer for debugging purposes.

//Direct logging to specified file int logFileSet=webCallSetLogging(("logs/WebCallclient.log");

The following example is included to explain how to deploy the distributed component of the present disclosure on a WebLogic 6.0+.

Example 4

The WebCall EjbServlet is provided in a single tar file. For example purposes, assume that WebCall.tar is the file name holding the information for the Java class files for the Java code that comprises the EjbServlet. Deployment of the EjbServlet on a WebLogic 6.0+ application server can occur according to the following steps:

1. Copy the tar file to a location used by the client application to store its own component (e.g., EJBs) files.

2. Extract all files from the tar file using the Unix tar utility. The proper command line is:

tar xvf WebCall.tar*

This will extract all necessary files into a WebCall subdirectory, overwriting all previous versions of the files if present.

3. Examine the web.xml.template file in the WebCall/WEB-INF directory. Adjust the initialization parameters as necessary. Typically, only the DebugLevel parameter is adjusted.

4. Make sure that an entry is added to the transformFiles file to transform the web.xml.template (located in WebCall/WEB-INF) into an environment-specific web.xml file.

5. Stop and restart the managed servers to which the EjbServlet will be deployed.

6. Use a web browser to open the WLS (WebLogic Server) administrator console for the application's domain. (If the console does not respond properly, start the domain admin server.)

7. Under "Web Applications", select the "Configure a new Web Application . . . " link. This displays the "Web Applications>create" page. If desired, navigate to the "General" tab.

8. Type WebCall in the Name field. Type WebCall in the URI field. In the Path field, type the full path of the application's lib directory (e.g., /<env>/<applId>lib). Make sure the Deployed checkbox is checked. Finally, click the Create button.

9. Navigate to the Targets tab and then select the Servers tab. Select the managed instance(s) to which the EjbServlet should be targeted, then click the Apply button.

10. If applicable, select the Clusters tab. Select the cluster(s) to which the EjbServlet should be targeted, then click the Apply button.

To check that the EjbServlet is available, use a web browser to access the following URL:

http://<hostname:port>/WebCall/EjbServlet/

This should display a page listing the servlet name, version number, and other information. Note that the bracketed item desirably should be replaced with the proper hostname:port combination. These values are dependent on the location and configuration of the application server.

Example 5

To further help to illustrate the rules regarding the syntax of method signatures and method parameters when calling EJBs, some samples are given in Table 7. In each sample, the body of each element is underlined to help distinguish it from the element keyword and equal sign that precedes it.

TABLE 7

| Elements | Examples |
| --- | --- |
| method signature: | methodSig=aMethod( ) |
| method parameters: | |
| method signature: | methodSig=aMethod(String) |
| method parameters: | methodParams=; |
| method signature: | methodSig=aMethod(String) |
| method parameters: | methodparams=; |
| method signature: | methodSig=aMethod(String, String) |
| method parameters: | methodParams=;;the first parameter is an empty string (like previous example) |

TABLE 7-continued

| Elements | Examples |
|---|---|
| method signature: | methodSig=aMethod(int,String double) |
| method parameters: | methodParams=,16,Here's a string,3.1415923 |
| method signature: | methodSig=aMethod (string [4]) |
| method parameters: | methodParams=&JOHN LENNON&PAUL MCCARTNEY&GEORGE HARRISON&RINGO STARR |
| method signature: | methodSig=aMethod(String[2] [3]) |
| method parameters: | methodParams=;str(0,0);str(0,1);str(0,2);str(1,0);str(1,1);str(1,2) |
| method signature: | methodSig=aMethod (mypackage.Color(String,String,String)) |
| method parameters: | methodParams=+red+green+blue |
| method signature: | methodSig=aMethod(Vector(mypackage.Color(String,String,String))[2]) |
| method parameters: | methodParams="red"green"blue"cyan"magenta"yellow |
| method signature: | methodSig=aMethod(mypackage.Rect(int.int,String) [2] ,boolean,String) |
| method parameters: | methodParams=,480,320,Small Rect,640,480,Big Rect,true,Dual Rectangles |
| method signature: | methodSig=aMethod(mypackage.DullObject( )) |
| method parameters: | methodParams=; |
| method signature: | methodSig=aMethod(String,mypackage.AnObject( )) |
| method parameters: | methodParame=#My Text# |
| method signature: | methodSig=aMethod(mypackage.AnObject( ),String) |
| method parameters: | methodParams=;;A string |
| method signature: | methodSig=aMethod(mypackage.AnObject( ),String,mypackage.TheirObject( )) |
| method parameters: | methodParams=;;A string; |
| method signature: | methodSig=aMethod(mypackage.MyObject( ),mypackage.MyOtherObject( )) |
| method parameters: | methodParams=,, |
| method signature: | methodSig=aMethod(String,String).toString ( ) |
| method parameters: | methodParams=,string1,string2 |
| method signature: | methodSig=aMethod(String,String).getAnotherObject(int).getValue(String) |
| method parameters: | methodparams=,string1,string2,100,string3 |
| method signature: | methodSig=aMethod( ).toText(String) |
| method parameters: | methodParams=,'toText( ) Parameter' |

Example 6

As explained previously, the client library extracts, parses, and converts a returned HTTP response text string received back from the EjbServlet into data values compatible with the non-Java application, places them into the buffers provided by the calling code, and returns them to the non-Java application. The following pseudo-code example demonstrates using the format descriptor for parsing the returned text string.

```
Sub Parse (strFormat As String, strData as String)
    intCount = ItemCount(strFormat, ">")
    For I = 1 To intCount
        strTag = Item(strFormat, I, I, ">")
        strTagType = Left(strTag, 2)          'size of tag key is 2
        strName = Item(strTag, 2, 2, " >")
        intPos = Val(Item(strTag, 3, 3, " >"))
        intSize = Val(Item(strTag, 4, 4, " >"))
        'Add code below to access individual values in data string
        Select Case strTagType
            Case "<f"
                'a Field
            Case "<e"
                'an Element of an array, collection, or object
            Case "<x"
                'an eXception
            Case Else
                'unknown item type
        End Select
    Next I
End Sub
```

What we claim as our invention is:

1. A method of accessing an Enterprise Java Bean (EJB) by a non-Java application within a computing environment, comprising:
   a) making a call, by the non-Java application, to a client library, wherein the call includes input parameters, and wherein the client library is a linkable library that is dynamically linked to the non-Java application;
   b) invoking a function within the client library to construct an HTTP request corresponding to the input parameters of the call made from the non-Java application, wherein numeric primitive data types of the non-Java application in the calling input parameters are converted into a corresponding text representation in the HTTP request;
   c) passing the HTTP request from the client library to an EjbServlet;
   d) invoking a method on an EJB by the EjbServlet based upon the HTTP request;
   e) returning information from the invoked method from the EJB to the EjbServlet;
   f) decoding the returned information from the invoked method into an HTTP response string by the EjbServlet;
   g) transmitting the HTTP response from the EjbServlet to the client library; and
   h) parsing converting the HTTP response by the client library into return information compatible with the non-Java application and then passing the return information compatible with the non-Java application from the client library to the non-Java application, wherein text-represented numeric values extracted from the HTTP response are converted into a corresponding numeric primitive data type of the non-Java application;
   and i) allocating buffers by the non-Java application to hold calling input parameters sent to the client library and the return information compatible with the non-Java application received from the client library, wherein the return information compatible with the non-Java application is placed into two buffers, and wherein the two buffers comprise a data buffer and a format buffer, wherein the data buffer comprises an information text string comprising a text representation of the return information compatible with the non-Java application from the invoked method, the format buffer comprises a format text string generated by the EjbServlet comprising format information about the return information compatible with the non-Java application, and the format text string comprises tags that comprise a name field, a start position field, and a length field used to locate data values in the information text string.

2. The method of claim 1 wherein the invoked method is a chained method.

3. The method of claim 1 wherein the invoking a method on the EJB by the EjbServlet further comprises passing one or more input parameters by the EjbServlet to the EJB.

4. The method of claim 3 wherein the input parameters comprise one or more input objects constructed by the EjbServlet based on the HTTP request.

5. The method of claim 1 wherein the returning information from the invoked method from the EJB to the EjbServlet further comprises the EJB constructing a return object based upon the information form the invoked method and passing the return object to the EjbServlet.

6. The method of claim 5 wherein the return object is a chained object.

7. The method of claim 5 wherein the decoding the returned information into an HTTP response string by the EjbServlet further comprises decoding the return object into an HTTP response string by the EjbServlet.

8. The method of claim 1 wherein the HTTP request and the HTTP response each comprise a series of bytes representing HTTP-specific control information or text strings.

9. The method of claim 8 wherein the HTTP request and the HTTP response are passed between the client library and the EjbServlet via an HTTP protocol.

10. The method of claim 9 wherein the HTTP protocol enables the client library and EjbServlet to communicate across a distributed computing environment.

11. The method of claim 1 wherein the non-Java application is based on a programming environment capable of calling external library functions via the C calling convention.

12. The method of claim 1 wherein the calls between the client library and the non-Java application are based upon the C language calling convention.

13. The method of claim 1 wherein the EjbServlet and the method invoked on the EJB is identified by a calling input parameter embedded in the HTTP request.

14. The method of claim 1 wherein the method is invoked via a remote method invocation (RMI) protocol.

15. The method of claim 14 wherein the RMI enables the EjbServlet and the EJB to communicate across a distributed computing environment.

16. The method of claim 1 further comprising passing additional decoded return information wherein the information from the invoked method exceeds the data buffer capacity, the format buffer capacity, or both.

17. The method of claim 16 wherein the EjbServlet stores the remaining decoded EJB method call results in memory.

18. The method of claim 16 wherein the client library passes a return code to the non-Java application indicating that information from the invoked method remains in the EjbServlet.

19. The method of claim 16 wherein additional return data and format strings are passed until all of the decoded information from the invoked method is received by the non-Java application.

20. The method of claim 16 wherein the EjbServlet passes a key to the client library identifying any information from the invoked method remaining in the EjbServlet.

21. The method of claim 20 wherein the client library places the key in a session ID parameter.

22. The method of claim 21 wherein the client library provides the key to the non-Java application.

23. The method of claim 22 wherein non-Java application accesses the information from the invoked method remaining in the EjbServlet using the key.

24. The method of claim 1 further comprising invoking a logging function within the client library.

25. A computing system for accessing an EJB by a non-Java application comprising:
   a) a computer storage medium encoded with instructions that when executed by a processor provides: a non-Java application in communication with a client library, wherein the client library is a linkable library that is dynamically linked to the non-Java application; wherein the non-Java application is configured to make a call to the client library to establish communication between the non-Java application and the client library, wherein the client library comprises a function to take input parameter information from the call, embed the information into an HTTP request, and transfer the HTTP request, and wherein numeric primitive data types of the non-Java application in the input parameter information are converted into a corresponding text representation in the HTTP request;
   b) a computer storage medium encoded with instructions that when executed by a processor provides: an EjbServlet configured to receive the HTTP request from the client library and invoke a corresponding method on an EJB wherein the EjbServlet is further configured to receive the returned Java objects from the EJB and convert the objects to return strings, construct an HTTP response containing the return strings, and transfer the HTTP response to the client library, wherein the client library is further configured to parse and convert the HTTP response into a return parameter string compatible with the non-Java application that is returned to the non-Java application, wherein text-represented numeric values extracted from the HTTP response are converted into a corresponding numeric primitive data type of the non-Java application, and wherein the non-Java application is further configured to allocate buffers to hold the return parameter string received from the client library, place the return parameter string into two buffers, wherein the two buffers comprise a data buffer and a format buffer, wherein the data buffer comprises an information text string comprising a text representation of data returned from the invoked methods, the format buffer comprises a format text string generated by the EjbServlet comprising format information about the information text string, and the format text string comprises tags that comprise a name field, a start position field, and a length field used to locate data values in the information text string; and
   c) a computer storage medium encoded with instructions that when executed by a processor provides: a remote method interface (RMI) for invoking methods and returning Java objects between the EjbServlet and the EJB.

26. The computer system of claim 25 wherein the EbjServlet constructs one or more input objects to invoke a method on the EJB.

* * * * *

UNITED STATES PATENT AND TRADEMARK OFFICE
CERTIFICATE OF CORRECTION

| | |
|---|---|
| PATENT NO. | : 7,617,504 B1 |
| APPLICATION NO. | : 10/657579 |
| DATED | : November 10, 2009 |
| INVENTOR(S) | : Hill et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1473 days.

Signed and Sealed this

Nineteenth Day of October, 2010

David J. Kappos
*Director of the United States Patent and Trademark Office*